US012447639B2

(12) United States Patent
Palero et al.

(10) Patent No.: US 12,447,639 B2
(45) Date of Patent: Oct. 21, 2025

(54) DETERMINING OPERATING PARAMETERS OF HAIR CUTTING DEVICES

(71) Applicant: KONINKLIJKE PHILIPS N.V., Eindhoven (NL)

(72) Inventors: Jonathan Alambra Palero, Waalre (NL); Mathivanan Damodaran, 'S-Hertogenbosch (NL); Yannyk Parulian Julian Bourquin, Eindhoven (NL); Babu Varghese, Eindhoven (NL); Oedilius Johannes Bisschop, Drachten (NL); Lu Wang, Eindhoven (NL); Willem Auke Westerhof, Drachten (NL); Stephanus Jacob Gerardus Temminga, Paterswolde (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 258 days.

(21) Appl. No.: 18/274,005

(22) PCT Filed: Jan. 12, 2022

(86) PCT No.: PCT/EP2022/050508
§ 371 (c)(1),
(2) Date: Jul. 25, 2023

(87) PCT Pub. No.: WO2022/171374
PCT Pub. Date: Aug. 18, 2022

(65) Prior Publication Data
US 2024/0424700 A1 Dec. 26, 2024

(30) Foreign Application Priority Data
Feb. 9, 2021 (EP) .................................... 21156113

(51) Int. Cl.
*B26B 19/38* (2006.01)
*B26B 21/40* (2006.01)

(52) U.S. Cl.
CPC ........ *B26B 19/388* (2013.01); *B26B 21/4056* (2013.01)

(58) Field of Classification Search
CPC .......................... B26B 19/388; B26B 21/4056
See application file for complete search history.

(56) References Cited

U.S. PATENT DOCUMENTS 5,367,599 A 11/1994 Okada
5,687,481 A 11/1997 De Boer et al.
(Continued)

FOREIGN PATENT DOCUMENTS

EP 3375370 A1 9/2018

OTHER PUBLICATIONS

International Search report and Written Opinion of PCT/EP2022/050508, dated Jun. 15, 2022.

*Primary Examiner* — Omar Flores Sanchez

(57) ABSTRACT

According to an aspect, there is provided a system (100) comprising a hair cutting device (102) having a cutting element for cutting a subject's hair; a localisation unit (104) for acquiring location data indicative of a location of the cutting element relative to a body part of the subject; a timer unit (106) for measuring time data associated with usage of the hair cutting device; and a processing unit (108) in communication with the hair cutting device, the localisation unit and the timer unit, the processing unit being configured to determine, based on the location data and the time data, an operating parameter to be applied to the hair cutting device.

12 Claims, 5 Drawing Sheets

(56) References Cited

U.S. PATENT DOCUMENTS

| | | | |
|---|---|---|---|
| 8,667,692 | B2 | 3/2014 | Kraus |
| 10,259,131 | B2 * | 4/2019 | Krenik .................. B26B 19/388 |
| 10,960,560 | B2 * | 3/2021 | Robinson ............ B26B 21/4081 |
| 11,468,595 | B2 | 10/2022 | Buil et al. |
| 2016/0297085 | A1 | 10/2016 | Uit De Bulten et al. |
| 2018/0204346 | A1 | 7/2018 | Van Bree et al. |
| 2019/0191850 | A1 | 6/2019 | Yoganandan et al. |
| 2019/0224869 | A1 * | 7/2019 | Robinson .............. B26B 21/227 |
| 2019/0232510 | A1 | 8/2019 | Zandsteeg et al. |
| 2019/0299435 | A1 | 10/2019 | Fuellgrabe et al. |
| 2019/0299436 | A1 | 10/2019 | Fuellgrabe et al. |
| 2019/0306259 | A1 * | 10/2019 | Burghardt ........... B26B 21/4081 |
| 2020/0033448 | A1 | 1/2020 | Bourquin et al. |
| 2020/0037927 | A1 | 2/2020 | Palero et al. |
| 2020/0316799 | A1 * | 10/2020 | Tsegenidis .......... B26B 21/4087 |
| 2020/0397546 | A1 * | 12/2020 | Miller ....................... H02J 7/00 |
| 2021/0260780 | A1 * | 8/2021 | Zafiropoulos ....... B26B 19/3813 |
| 2022/0001556 | A1 * | 1/2022 | Good .................. B26B 21/4081 |
| 2022/0176575 | A1 | 6/2022 | Flinsenberg et al. |
| 2023/0177741 | A1 * | 6/2023 | Bourquin ................ G06T 11/00 345/633 |
| 2025/0170735 | A1 * | 5/2025 | Liu ....................... B26B 19/388 |

* cited by examiner

DETERMINING OPERATING PARAMETERS OF HAIR CUTTING DEVICES

CROSS-REFERENCE TO PRIOR APPLICATIONS

This application is the U.S. National Phase application under 35 U.S.C. § 371 of International Application No. PCT/EP2022/050508, filed on Jan. 12, 2022, which claims the benefit of European Patent Application No. 21156113.9, filed on Feb. 9, 2021. These applications are hereby incorporated by reference herein.

FIELD OF THE INVENTION

The invention relates to hair cutting devices and, in particular, to determining operating parameters to be applied to hair cutting devices.

BACKGROUND OF THE INVENTION

Personal care devices may be used to perform personal care activities, such as shaving, cutting or trimming hair. Operating parameters of the personal care device being used may be adjusted in order to change the outcome of the personal care activity. For example, in the case of a hair trimmer, a blade guard may be adjusted in order to vary the position at which the hair is cut, thereby controlling the length of the cut hair.

When performing some personal care activities, such as shaving, spending too long treating a particular region of the user's body (e.g. of the subject's skin) may adversely affect the user, for example by causing pain or irritation.

Users of personal care devices might not be aware while performing the personal care activity that they are spending too long in a particular region of their body, which could lead to irritation or pain following the completion of the personal care activity. Moreover, users may find it difficult to adjust settings and operating parameters of personal care devices in such a way that the operation of the devices can be adjusted to reduce the pain or irritation caused.

Therefore, it would be beneficial to have a system capable of determining adjustments to be made to the operating parameters of a personal care device, in order to mitigate one or more of the problems mentioned above.

SUMMARY OF THE INVENTION

When using a hair cutting device (e.g. a head trimmer or shaving device) to perform a personal care activity, such as a hair cutting activity, the user experience may be worsened if the user experiences pain or discomfort as a result of using hair cutting device. Such pain or discomfort may result from the user using the hair cutting device in the same region on the skin of their body, for example moving a shaving device around the same region of skin on their face. The inventors of the present disclosure have recognised that, by measuring the amount of time that a device is used within a particular region, it is possible to adjust one or more operating parameters of the device so that the hair cutting activity can be performed quicker in that region, thereby reducing the amount of time spent treating that region and thereby reducing the likelihood that pain or discomfort will be experienced by the user.

According to a first specific aspect, there is provided a system comprising a hair cutting device having a cutting element for cutting a subject's hair; a localisation unit for acquiring location data indicative of a location of the cutting element relative to a body part of the subject; a timer unit for measuring time data associated with usage of the hair cutting device; and a processing unit in communication with the hair cutting device, the localisation unit and the timer unit, the processing unit being configured to determine, based on the location data and the time data, an operating parameter to be applied to the hair cutting device.

In some embodiments, the system may further comprise a storage unit for storing the location data, the time data and the determined operating parameter.

The processing unit may be further configured to operate the hair cutting device according to the determined operating parameter.

The processing unit may, in some embodiments, be configured to determine, based on the acquired location data, a region of the subject's body part corresponding to the location of the cutting element.

In some embodiments, the processing unit may be configured to determine, based on the time data and the determined body part region, an amount of time spent by the cutting element within the determined body part region; and determine, based on the determined amount of time, an operating parameter to be applied to the hair cutting device when the cutting element is within the determined body part region.

The processing unit may be configured to determine, based on the time data and the determined body part region, an amount of time spent by the cutting element within the determined body part region; calculate, based on the determined amount of time and a reference duration corresponding to the determined body part region, a performance score indicative of the hair cutting performance within the determined body part region; and determine, based on the performance score, an operating parameter to be applied to the hair cutting device when the cutting element is within the determined body part region.

In some embodiments, the hair cutting device may comprise an accelerometer configured to measure acceleration data indicative of an acceleration of the hair cutting device during use.

In such embodiments, the processing unit may be configured to determine, based on the acceleration data and the acquired location data, a number of passes made with the hair cutting device over skin of the subject within the determined body part region; and determine, based on the number of passes made over the skin, an operating parameter to be applied to the hair cutting device when the cutting element is within the determined body part region.

The hair cutting device may, in some embodiments, comprise an accelerometer configured to measure acceleration data indicative of an acceleration of the hair cutting device during use.

In such embodiments, the processing unit may be configured to determine, based on the acceleration data, an average speed of motion of the hair cutting device over skin of the subject within the determined body part region; and determine, based on the average speed of motion, an operating parameter to be applied to the hair cutting device when the cutting element is within the determined body part region.

The storage unit may be configured to store location data and time data for the hair cutting device acquired over a plurality of hair cutting activities performed by the subject; and wherein the processing unit is configured to determine, based on the stored data over the plurality of hair cutting activities, an optimum operating parameter.

In some embodiments, the operating parameter to be applied to the hair cutting device may comprise an operating parameter selected from a group comprising: a position of a blade of the cutting element relative to skin of the subject; a spindle force applied to a spindle of the cutting element; and a rotational speed of a blade of the cutting element.

According to a second specific aspect, there is provided a computer-implemented method of determining operating parameters of a hair cutting device, the method comprising obtaining location data indicative of a location of a cutting element of the hair cutting device relative to a body part of a subject whose hair is being cut using the hair cutting device; obtaining time data associated with usage of the hair cutting device; and determining, based on the location data and the time data, an operating parameter to be applied to the hair cutting device.

In some embodiments, the method may further comprise applying the determined operating parameter to the hair cutting device.

Determining an operating parameter may, in some embodiments, comprise determining an operating parameter to be applied to the hair cutting device so as to cause the subject's hair to be cut more quickly.

According to third specific aspect, there is provided a computer program product comprising a non-transitory computer-readable medium, the computer-readable medium having computer-readable code embodied therein, the computer-readable code being configured such that, on execution by a suitable computer or processor, the computer or processor is caused to perform the steps of the method disclosed herein.

According to fourth specific aspect, there is provided a hair cutting device comprising a cutting element for cutting a subject's hair; a localisation module for acquiring location data indicative of a location of the hair cutting element relative to a body part of the subject; a timer module for measuring time data associated with usage of the hair cutting device; and a processor configured to determine, based on the location data and the time data, an operating parameter to be applied to the hair cutting device.

These and other aspects will be apparent from and elucidated with reference to the embodiment(s) described hereinafter.

BRIEF DESCRIPTION OF THE DRAWINGS

Exemplary embodiments will now be described, by way of example only, with reference to the following drawings, in which.

DETAILED DESCRIPTION OF THE EMBODIMENTS

Embodiments disclosed herein provide a mechanism by which an adjustment to be made to an operating parameter of a hair cutting device can be automatically determined based on measurements of the device's location relative to a subject and the amount of time that the device is used to treat particular regions of the subject. By identifying regions where the device is being used for a relatively longer duration, it is possible to adjust one or more settings or operating parameters of the device so that hair can be cut in those regions in less time.

Figure 1:
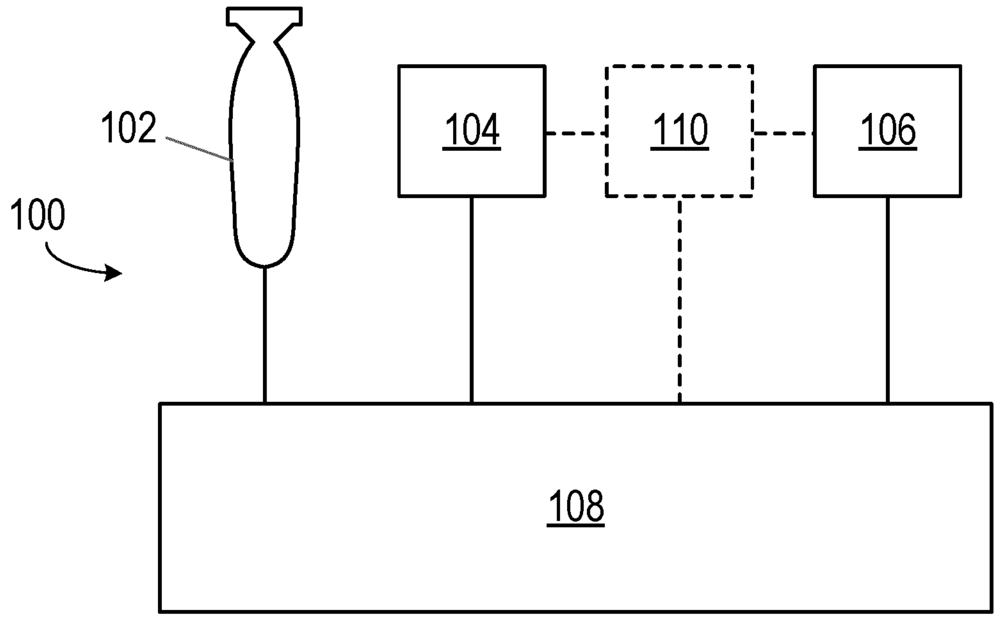
FIG. 1 is a schematic illustration of an example of a system according to various embodiments.

One aspect of the present invention relates to a system. FIG. 1 is a schematic illustration of an example of a system 100. The system 100 may, for example, be referred to as a system for determining operating parameters of a hair cutting device. The system 100 comprises a hair cutting device 102, a localisation unit 104, a timer unit 106 and a processing unit 108. Components of the system may be in communication with one another via a wired or wireless (e.g. WiFi, Bluetooth (RTM)) connection. The hair cutting device 102 may comprise any device (e.g. a personal care device), such as a device capable of cutting and/or removing hair from a subject. For example, the hair cutting device 102 may comprise a hair trimmer or clipper, a shaving device, or the like. The hair cutting device 102 has a cutting element for cutting a subject's hair. The cutting element may comprise one or more blades movable relative to the hair to be cut, such that when the blade or blades engage the hair, the hair is cut at the point of engagement. Typically, such a hair cutting device may include a body to which the cutting element may be permanently or removably attached, or the cutting element may be formed integrally with the body. The body may house various components of the hair cutting device 102 including, for example, a power supply (e.g. a battery), and a drive mechanism for the cutting element. Features of an example hair cutting device 102 are discussed below with reference to FIG. 4.

The localisation unit 104 of the system 100 is for acquiring location data indicative of a location of the cutting element relative to a body part of the subject. In some examples, the localisation unit 104 may comprise an imaging device, such as a camera, configured to capture image data of the hair cutting device 102, from which a location of the cutting element relative to a body part of the subject may be determined. For example, such an imaging device may be used to capture images of the hair cutting device 102 and a body part (e.g. a head or a face) of the subject using the hair cutting device during a hair cutting activity (e.g. shaving). An imaging device may be a stand-alone device such as a camera, or may form part of another device, such as a laptop computer, a tablet computer, a smartphone or an interactive mirror (sometimes referred to as a smart mirror).

Techniques for determining the location of a personal care device relative to a subject or relative to a body part of the subject are known. In some examples, known detection techniques may be used to determine from the captured image data which part of the subject's body is being treated using the personal care device (e.g. the hair cutting device 102). For example, if the hair cutting device 102 is being used to cut hair on the subject's head or face, then facial feature recognition technology may be used to identify features of the subject's face, from which a determination may be made as to the relative location of the cutting element.

In some cases, it may be intended that image data in respect of a subject performing a personal care activity is not captured, for example to ensure privacy for the subject. Thus, in other examples, the localisation unit 104 may comprise a component other than an image capture device. For example, the localisation unit 104 may determine a location of the cutting element of the hair cutting device 102 relative to a body part of the subject by determining the position of one or more sensors on the hair cutting device relative to one or more sensors located on the subject or on the body part of the subject. In one example, a subject may position one or more sensors on their head (e.g. on a headband worn by the user during shaving activity), and these are sensors may interact with one or more sensors located on the hair cutting device 102, such that the relative position of the hair cutting device, and the orientation of the hair cutting device, may be determined during use.

In other examples, other techniques may be used for determining the location of the cutting element relative to the body part of the user. For example, skin and/or hair parameters may be measured during use and used to determine the relative location of the hair cutting device 102. Additionally or alternatively, other location determination techniques not discussed herein may be used.

The timer unit 106 is configured to measure time data associated with the usage of the hair cutting device 102. The timer unit 106 may, for example, measure an amount of time that the hair cutting device 102 is operated during a hair cutting activity and, in particular, may measure an amount of time that the hair cutting device 102 is located at various positions or locations relative to the body part of the subject. In some examples, as discussed in greater detail below with reference to FIG. 2, the timer unit 106 may measure the amount of time that the hair cutting device 102 is operated within certain regions or zones of the subject (e.g. defined regions of the subject's head or face, such as "upper left cheek", "upper right cheek", "chin", "left side neck", and so on). The regions or zones may be defined at any desired level of granularity or resolution, and may include small specific defined regions of the face, or larger more general defined regions of the subject's body, such as "scalp", "face", "back", "leg", and so on.

The processing unit 108 is in communication with the hair cutting device 102, the localisation unit 104 and the timer unit 106. The processing unit 108 may be in operable communication with one or more of the components of the system 100, such that it is able to control the hair cutting device 102, the localisation unit 104 and/or the timer unit 106 and, in some embodiments, the processing unit may be configured to receive data from one or more of the components, perform processing tasks in respect of the data, and operate one or more components in response to data obtained from the processing tasks.

According to embodiments disclosed herein, the processing unit 108 is configured to determine, based on the location data and the time data, an operating parameter to be applied to the hair cutting device 102. In general, based on the amount of time that the hair cutting device 102 is used as a particular location (e.g. within a defined region 102), the processing unit 108 determines an operating parameter or multiple operating parameters that may be changed or adjusted in order to reduce the amount of time that the hair cutting device is used at the particular location, while still achieving the same result from the hair cutting activity. In one example, it may be determined that a subject is using a shaving device to shave hair on their face and neck. It may be determined that the subject spends significantly more time shaving then neck than their cheeks, and this could lead to pain or irritation in the neck area. The reason for the increased amount of time may be due to the difference in the hair growing in different areas of the body; for example, neck hair may be thicker than cheek hair, so may generally take longer to cut. Thus, the processing unit 108, in this example, may determine that increasing a rotational speed of blades of the shaving device would help to cut hair in the neck region more quickly, meaning the subject could spend less time treating that area, thereby reducing the risk of pain or irritation occurring. In some embodiments, the operating parameter determined by the processing unit 108 may be considered to be an optimised operating parameter given the time spent by the hair cutting device 102 at a particular location, or an operating parameter intended to provide improved or even optimum hair cutting performance. The processing unit 108 may, in some embodiments, apply the adjustment to the shaving device when it is determined that the shaving device is located in the neck region (i.e. when the subject is using the shaving device to shave their neck).

In some embodiments, the system 100 may further comprise a storage unit 110, such as a memory for storing data. The storage unit 110 may be used for storing the location data, the time data and the determined operating parameter. The storage unit 110 is also in communication with, and is accessible by, the processing unit 108 and/or other components of the system 100. As discussed in greater detail below, data stored in the storage unit 110 may be accessed by the processing unit 108 and used for other purposes.

Once an operating parameter has been determined by the processing unit 108, the processing unit may, in some embodiments, operate the hair cutting device 102 according to the determined operating parameter. Thus, if it is determined by the processing unit 108 that an operating parameter is to be adjusted in order to improve the hair cutting rate in a particular region, then the processing unit may send an operating signal or an instruction signal to the hair cutting device 102 to cause the operating parameter to be adjusted in the appropriate manner.

The location data acquired using the localisation unit 104 may comprise data indicating the location of the cutting element of the hair cutting device 102 to a range of different spatial resolutions or scales. In some embodiments, the localisation unit 104 may be configured to acquire location data on a millimetre-scale or even smaller. In such examples, the location data may be mapped onto an image of the body part of the subject or a model of the body part of the subject divided into small (e.g. square millimetre-sized) units or pixels, such that the location of the cutting element of the hair cutting device 102 can be defined accurately with reference to the image or model. It will be understood that the cutting element of a hair cutting device 102 will be larger than the units (e.g. millimetre-scale units) that may be used to define its location. Therefore, the location of the cutting element may be defined in terms of a location of a single reference point of the cutting element (e.g. the centre of the cutting element). Alternatively, a boundary or perimeter of the cutting element may be known and the location of the cutting element may be defined in terms of the pixels or units of the image or model that the cutting element covers (i.e. corresponding to the area of the subject's body that the cutting element covers). In other examples, larger units may be used to define the location of the cutting element, thereby corresponding to a lower resolution.

Figure 2:
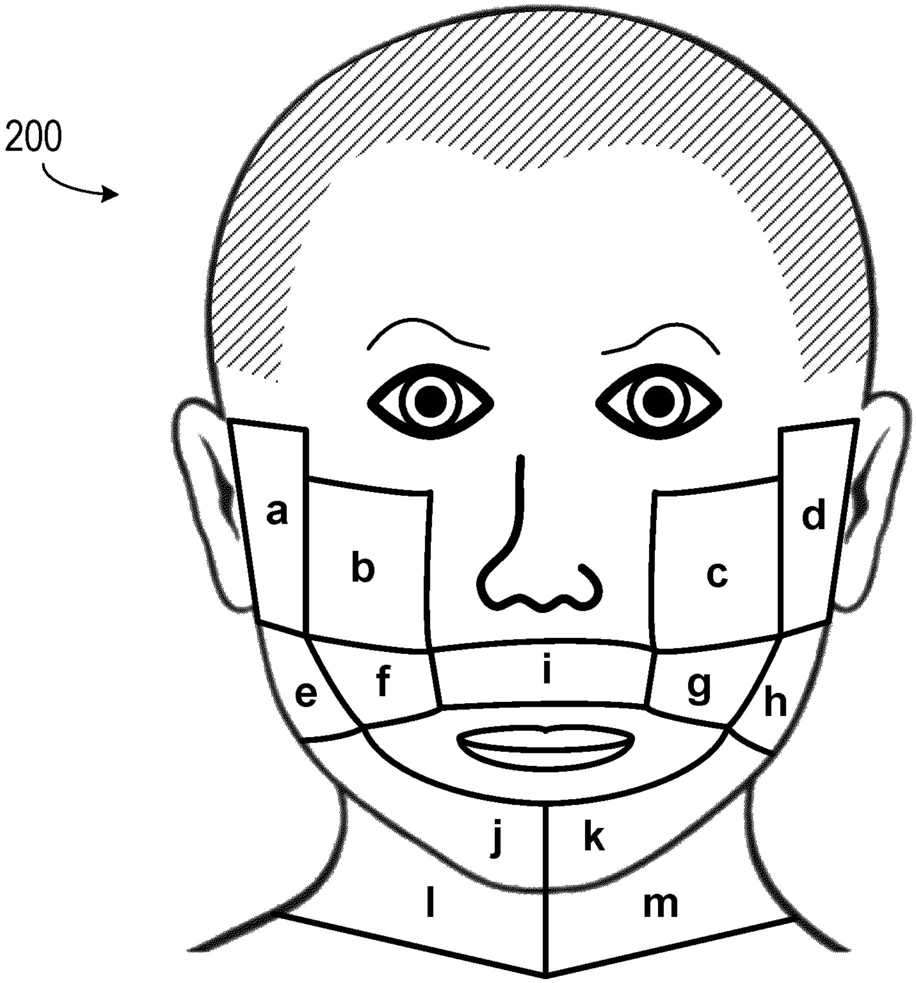
FIG. 2 is an illustration showing an example of various regions indicated on a subject's face.

In some embodiments, the location of the cutting element of the hair cutting device 102 may be defined with reference to one or more defined regions of the body part of the subject. For example, a subject's face may be divided into a plurality of defined regions, and the location of the cutting element (e.g. a reference point such as the centre point of the blade or blades of a shaving device) may be defined with reference to the defined regions. FIG. 2 is an illustration example of a plurality of defined regions indicated on an image 200 of the face of a subject. In this example, 13 defined regions 202*a* to 202*m* are indicated on the subject's face, though it will be appreciated that more or fewer regions may be defined depending on the intended resolution of the location, the body part, and the like. In FIG. 2, for example, the region 202*b* corresponds to the subject's right upper cheek, the region 202*i* corresponds to the area above the subject's upper lip, the region 202*k* corresponds to the left side of the subject's chin and the region 2021 corresponds to the right side of the subject's neck. Other regions defined in FIG. 2 correspond to other parts of the subject. In this example, if the reference point of the cutting element is determined, from the localisation unit 104, to be within the region 202*b*, then the processing unit 108 may classify the determined location as 'right upper cheek'. Thus, the processing unit 108 may be configured to determine, based on the acquired location data, a region (e.g. a defined region 202) of the subject's body part corresponding to the location of the cutting element.

The timer unit 106 may measure an amount of time that the hair cutting device 102 is operated within each defined region. Thus, if the subject were to start shaving with the cutting element of the hair cutting device 102 positioned within the region 202*b*, then the timer unit 106 may record the duration that the cutting element spends within that region. If the subject moves the hair cutting device 102 to a new location, such that the cutting element is determined to be located within the region 202*f*, then the timer unit starts recording a new duration indicative of the time that the cutting element spends within that region. The durations recorded for each defined region may be combined (e.g. added together) in order to calculate the total time spent treating each region of the body part (e.g. face) of the subject during a particular hair cutting activity. Thus, the processing unit 108 may be configured to determine, based on the time data and the determined body part region (e.g. the region 202), an amount of time spent by the cutting element within the determined body part region.

In some embodiments, the processing unit 108 may be further configured to determine, based on the determined amount of time (i.e. the determined amount of time spent by the cutting element within the determined body part region), an operating parameter to be applied to the hair cutting device 102 when the cutting element is within the determined body part region. In some examples, the processing unit 108 may be configured to apply a particular operating parameter to their cutting device 102 when it is determined that the cutting element is within a particular body part region. For example, the processing unit 108 may refer to a lookup table or database to determine that hair within particular body part regions can be cut more effectively (e.g. quicker) if a particular operating parameter is applied or adjusted (e.g. if the blade rotation speed is increased). Such reference material (e.g. a lookup table or database) may be stored in the storage unit 110, or accessible by some other means (e.g. via access to a cloud storage facility).

Thus, each region in a set of body part regions may have one or more corresponding operating parameters which can be applied when it is determined that the cutting element of the hair cutting device 102 is within a particular region. In examples where operating parameters are not predefined for a given set of body part regions, the processing unit 108 may "learn" how to modify operating parameters based on usage of the hair cutting device 102 by the subject. While a user of the hair cutting device 102 (e.g. the subject) performs a hair cutting activity (e.g. shaving), the location data and corresponding time data may be acquired by the localisation unit 104 and the timer 106 respectively. The data may be stored in a memory (e.g. in the storage unit 110), and analysed (e.g. by the processor 108) to determine an amount of time that the cutting element spent in each defined region of the subject's body part (e.g. the regions 202 in FIG. 2). If it is determined that the subject spent relatively longer cutting hair in certain regions (e.g. in the regions 2021 and 202*m*, corresponding to the subject's neck), then an operating parameter or an operating parameter adjustment may be allocated or assigned to those regions, for example to cause the blade rotation speed to increase, so that the hair in those regions is cut quicker. Once the operating parameter or the adjustment to the operating parameter has been determined, it may be stored (e.g. in the storage unit 110) an association with the body part region or regions to which it relates so that, during future hair cutting activities, the appropriate operating parameter may be retrieved from the storage unit and applied to the hair cutting device 102 when it is determined that the cutting element is within the body part region.

In some examples, a stored operating parameter for a particular agent may be updated automatically based on new and updated data acquired during a hair cutting activity, or updated manually, for example by the subject or by another user of the hair cutting device, to provide an element of personalisation.

In some embodiments, further processing of the acquired data (e.g. the location data and the time data) may be performed in order to make the determination of the operating parameter even more appropriate. As discussed above, the processing unit 108 may determine, based on the time data and the determined body part region, an amount of time spent by the cutting element within the determined body part region. The processing unit 108 may be further configured to calculate, based on the determined amount of time and a reference duration corresponding to the determined body part region, a performance score indicative of the hair cutting performance within the determined body part region. The reference duration for a particular body part region may represent an "ideal" or optimum" duration to be spent treating (e.g. cutting hair in) that body part region. In some examples, the reference duration may be determined by calculating an average duration spent in corresponding regions by other users of hair cutting devices. For example, data acquired from a population of users may be used to calculate an average time spent treating each of the defined body part regions, and the average duration for each body part region may be used as the reference duration. The performance score may be calculated based on a comparison of the measured duration for a particular body part region and the reference duration for that body region.

The performance score may, in some embodiments, be calculated based on how close the determined amount of time is to the reference duration; a higher performance score may be awarded if the amount of time that the cutting element spends within a particular body part region is relatively close to the reference duration. In some examples, the performance score may be based on a points system (e.g. a three-point system) whereby a maximum score (e.g. 3 points) is awarded if the determined amount of time is within a first defined margin (e.g. +/−2 seconds) of the reference duration, a middle score (e.g. 2 points) is awarded if the determined amount of time is outside the first defined margin but within a second defined margin (e.g. +/−4 seconds) of the reference duration and a lower score (e.g. 1 point) is awarded the determined amount of time is outside the second defined margin within a third defined margin (e.g. +/−6 seconds) of the reference duration. Other methods of calculating a performance score may alternatively be used. By calculating a performance score relative to a reference duration, a more meaningful understanding of the measured duration may be achieved, since relative duration is used rather than an absolute duration. Thus, the reference duration may be referred to as a baseline value or duration or a normalisation value or duration.

In examples where a performance score is calculated the processing unit 108 may be further configured to determine, based on the performance score, an operating parameter to be applied to the hair cutting device 102 when the cutting element is within the determined body part region. For example, a first operating parameter may be applied to the hair cutting device 102 if the performance score for a particular body part region exceeds a first threshold, while a second operating parameter may be applied to the hair cutting device if the performance score for that body part region is below a second threshold. In some embodiments, different operating parameters may be applied based on the performance score achieved for a particular body part region. More generally, the operating parameter to be applied to the hair cutting device 102 may vary as a function of the amount of time that the hair cutting device spends within a particular body part region.

In a further development, the performance score may, in some embodiments, be calculated based on an area of the body part region. This takes account of the expectation that a subject would spend longer treating (e.g. shaving) a relatively larger body part region than they would spend treating a relatively smaller part region. In this way, the defined body part regions (e.g. the regions 202 in FIG. 2) need not be of equal size, as the calculated performance score would take account of any differences in area.

In other embodiments, an operating parameter to be applied to the hair cutting device 102 may be determined, not only based on the time that the cutting element spends within a particular body part region, but further based on a number of passes made by the cutting element within the body part region. Taking this information into account may lead to a more appropriate adjustment to an operating parameter, as a cutting element may be moved quickly and repeatedly over a subject's skin in a particular body part region, such that the amount of time spent by the cutting element in that body part region may be relatively small, but the repeated movement of the cutting element background for the subject's skin may need to irritation and discomfort.

In some embodiments, the localisation unit 104 may be used to measure the number of passes made by the hair cutting device within a particular body part region. For example, in embodiments in which the localisation unit 104 comprises an imaging device, acquired image data may be used to measure the number of passes made by the cutting element of the hair cutting device 102. However, in other embodiments, additional components may be used to determine the number of passes. In some embodiments, the hair cutting device 102 may comprise an accelerometer configured to measure acceleration data indicative of an acceleration of the hair cutting device during use. The accelerometer may form part of an inertial measurement unit (IMU), which may include other components such as a gyroscope and/or a magnetometer. The acceleration data can be used to determine how the hair cutting device 102 is moved by the subject during use and, combined with the location data, the acceleration data can provide an indication of how many times the accelerometer (i.e. the hair cutting device) is moved back and forth within each defined body part region. Thus, the processing unit 108 may be configured to determine, based on the acceleration data and the acquired location data, a number of passes made with the hair cutting device 102 over skin of the subject within the determined body part region.

The processing unit 108 may be further configured to determine, based on the number of passes made over the skin, an operating parameter to be applied to the hair cutting device when the cutting element is within the determined body part region. For example, if it is determined that the cutting element is moved backwards and forwards over the skin a large number of times (e.g. making 20 passes), then the processing unit 108 may determine that an operating parameter should be applied or adjusted such that the hair in that body part region can be cut with fewer passes.

In some embodiments, a treatment pass density map may be created based on the determined number of passes within each defined body part region. Such a map might show numerically or visually how the number of passes made by the treatment element varies across different body part regions. An average treatment pass density may, in some embodiments, be determined for each defined body part region, and the average treatment pass density for each defined body part region may be used to calculate an average treatment speed. The average treatment speed can be calculated based on the relative distance moved by the cutting element, which can be determined from the acceleration data, and knowledge of the location and area of each defined body part region. Thus, in embodiments in which the hair cutting device 102 comprises an accelerometer, the processing unit 108 may be further configured to determine, based on the acceleration data, an average speed of motion of the hair cutting device 102 over skin of the subject within the determined body part region. In some examples, the processing unit 108 may determine an average speed of motion of the cutting element of the hair cutting device 102 over skin of the subject within the predetermined body part region. The processing unit 108 may be further configured to determine, based on the average speed of motion, an operating parameter to be applied to the hair cutting device when the cutting element is within the determined body part region. For example, a blade rotation speed of a shaving device may be adjusted in response to determining the average speed of motion of a shaving device over the skin of a subject within a particular body part region.

In some embodiments, a performance score may be calculated in respect of each defined body part region based on an area coverage of the cutting element of the hair cutting device 102, an amount of time spent by the cutting element within a particular body part region, an average speed of motion of the cutting element within that body part region and a reference value. The area coverage of the cutting element within a body part region may be calculated based on acceleration data from the accelerometer or from data acquired using an inertial measurement unit. The reference value in this case may comprise an average value or an optimum value for that particular body part region based on historic recorded data. The operating parameter to be applied to the hair cutting device 102 may be determined based for each body part region based on the corresponding performance score.

Historic data acquired using various components of the system 100 may be used by the processing apparatus 108 when determining operating parameters to be applied to the hair cutting device 102. The storage unit 110 may be configured to store location data and time data (e.g. acquired using the localisation unit 104 and the time at unit 106, respectively) or the hair cutting device 102 acquired over a plurality of hair cutting activities performed by the subject. Thus, each time the subject uses the hair cutting device 102 for a hair cutting activity, data may be stored in the storage unit 110. In some examples, an indication of the operating parameter used during each hair cutting activity and/or at each location may also be stored in the storage unit 110. The processing unit 108 may be configured to determine, based on the stored data over the plurality of hair cutting activities, an optimum operating parameter. For example, that processing unit 108, may analyse data acquired during the previous three hair cutting activities, and determine an optimum operating parameter based on those activities. The optimum operating parameter may be applied to the hair cutting device 102 for the next hair cutting activity performed by the subject. An operating parameter may be considered to be optimum if, over the course of several (e.g. three) hair cutting activities, a value representative of the operating parameter has converged towards a particular value. For example, if a gradual change in an operating parameter results in a corresponding reduction in the time spent cutting hair in a particular body part region, then the change in operating parameter can be considered to be converging towards an optimum value.

Depending on the hair cutting device 102 used in the system 100, a large number of operating parameters may be adjusted or applied. In some examples, the operating parameter to be applied to the hair cutting device 102 may comprise an operating parameter selected from a group comprising: a position of a blade of the cutting element relative to skin of the subject; a spindle force applied to a spindle of the cutting element; and a rotational speed of a blade of the cutting element. In some examples, multiple operating parameters may be applied. Adjusting the position of the blade of the cutting element relative to the skin of the subject may involve reducing the distance between the blade and the subject's skin, causing the hair to be cut with better closeness. This may result in the subject achieving a desired close cut more quickly in a particular body part region. In some hair cutting devices, varying the spindle force that is applied to a spindle of the cutting element causes the position of the blade of the cutting element to vary relative to a cap of the cutting element. During use, the cap is located between the blade and the skin of the user, and increasing the spindle force causes the blade to move closer to the cap, thereby improving the cutting effectiveness of the blade. Varying the spindle force may be achieved by causing an electromotive drive to adjust the force applied to the spindle and/or by applying heat to a shape memory alloy component, to cause it to expand, thereby increasing the force applied to the spindle. In some examples, increasing the rotational speed of a blade of the cutting element may cause hairs to be cut quicker.

Table 1 below shows an example of how an operating parameter of a hair cutting device 102 may be varied based on a hair cutting efficiency, calculated from data acquired using components of the system 100 disclosed herein.

TABLE 1

| Hair cutting efficiency ($mm^2/s$) | Performance score | Class definition | Determined operating parameter |
|---|---|---|---|
| >100 | 1 | Easy to shave region (low) | Low spindle force |
| 50 to 100 | 2 | Not-so-easy to shave region (medium) | Medium spindle force |
| <50 | 3 | Difficult to shave region (high) | High spindle force |

The hair cutting efficiency may be defined in terms of the area treated per second by the hair cutting device 102, and based on the measured efficiency, a performance score may be assigned. The class definition for each performance score gives an indication of the predicted difficulty involved in shaving a region based on the hair cutting efficiency. The operating parameter to be applied to the hair cutting device 102 based on each possible performance score is indicated in the right-hand column of Table 1.

Figure 3:
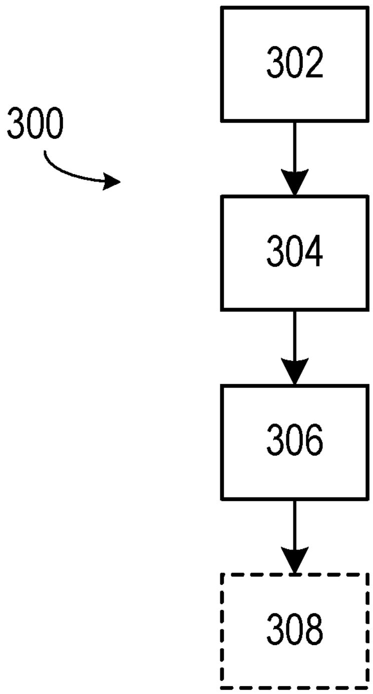
FIG. 3 is a flowchart of a method of determining operating parameters of the hair cutting device.

A further aspect of the present invention relates to a method. FIG. 3 is a flowchart of an example of a method 300. The method 300 may comprise a computer-implemented method, and may be considered to be a method of determining operating parameters of a hair cutting device, such as the hair cutting device 102. The method 300 comprises, at step 302, obtaining location data indicative of a location of a cutting element of the hair cutting device 102 relative to a body part of a subject whose hair is being cut using the hair cutting device. The location data may be obtained using the localisation unit 104 of the system 100 discussed above. At step 304, the method 300 comprises obtaining time data associated with usage of the hair cutting device. The time data may be obtained using the timer unit 106 discussed above. The method 300 comprises, at step 306, determining, based on the location data and the time data, an operating parameter to be applied to the hair cutting device 102. Step 306 may be performed using the processing unit 108 discussed above. In some embodiments, the method 300 may further comprise applying the determined operating parameter to the hair cutting device 102.

While different effects may be achieved depending on the operating parameter applied to the cutting device 102, some embodiments disclosed herein aim to reduce the time taken to perform a hair cutting activity, particularly by identifying regions of the subject (e.g. regions of a body part of the subject) where the time required to cut the subject's hair can be reduced by adjusting a parameter of the hair cutting device. Thus, determining an operating parameter may comprise determining an operating parameter to be applied to the hair cutting device 102 so as to cause the subject's hair to be cut more quickly.

One or more steps of the method 300 may be performed using the processing unit 108. According to some embodiments, the method 300 may further comprise additional steps corresponding to functions performed using the processing unit 108 discussed herein.

Figure 4:
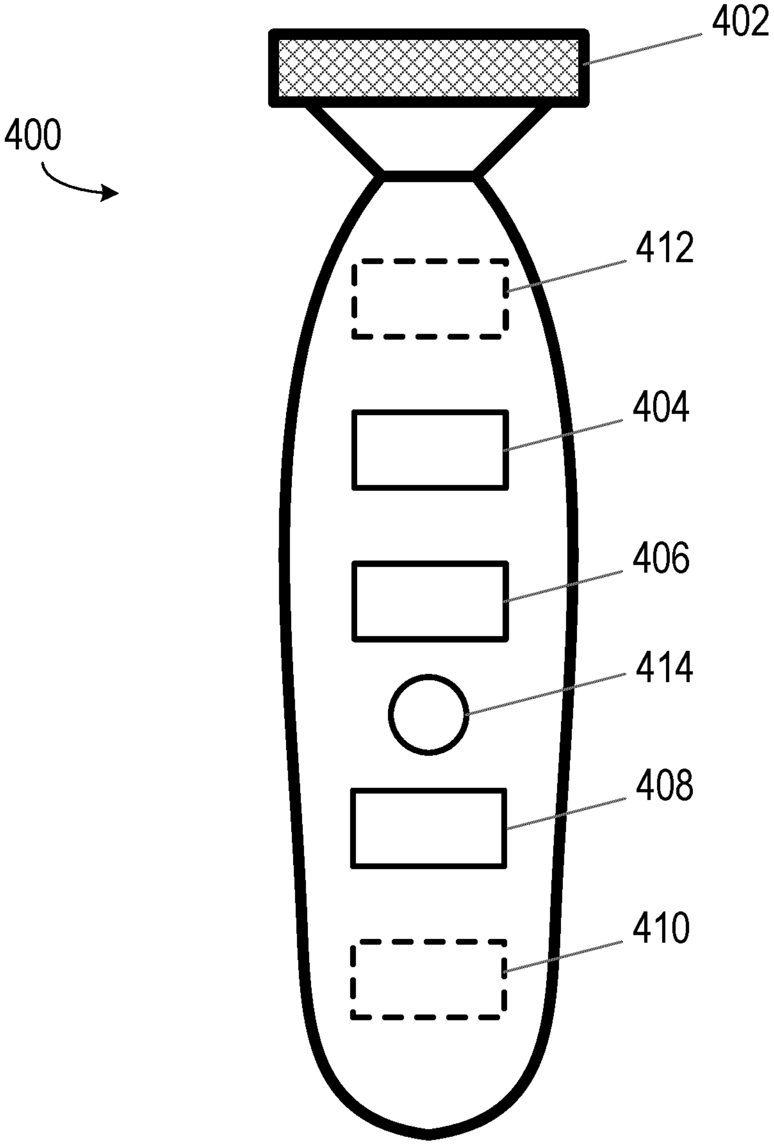
FIG. 4 is a schematic illustration of an example of a hair cutting device.

Another aspect of the present invention relates to an apparatus. Specifically, this aspect relates to a personal care device, such as a hair cutting device. According to some embodiments, the components of the system 100 discussed above may be incorporated into a single device, such as a hair cutting device. FIG. 4 is a schematic illustration of an example of the hair cutting device 400. The hair cutting device may comprise or function similarly to the hair cutting device 102 of the system 100 discussed herein. The hair cutting device 400 comprises a cutting element 402 for cutting a subject's hair. The cutting element 402 may, in some examples, comprise one or more blades and/or one or more linear and/or rotary teeth tracks, and may comprise a cutting element as discussed herein. The hair cutting device 400 further comprises a localisation module 404 for acquiring location data indicative of a location of the hair cutting element 402 relative to a body part of the subject. The localisation module 404 may comprise or function similarly to the localisation unit 104 discussed herein. The hair cutting device 400 further comprises a timer module 406 for measuring time data associated with usage of the hair cutting device. The timer module 406 may comprise or function similarly to the timer unit 106 discussed herein. The hair cutting device 400 further comprises a processor 408 configured to determine, based on the location data and the time data, an operating parameter to be applied to the hair cutting device 400. The hair cutting device 400 may be used in the system 100.

In some embodiments, the hair cutting device 400 may further comprise other components discussed herein. For example, the hair cutting device 400 may comprise a storage unit 410 which may be or function similarly to the storage unit 110 of the system 100 discussed herein. The hair cutting device 400 may, in some embodiments, further comprise an accelerometer or inertial measurement unit (IMU) 412, for measuring at least acceleration data indicative of acceleration of the hair cutting device 400 during use. The hair cutting device 400 may further comprise other components, such as a power supply (not shown) and a power switch 414 for operating the hair cutting device.

Figure 5:
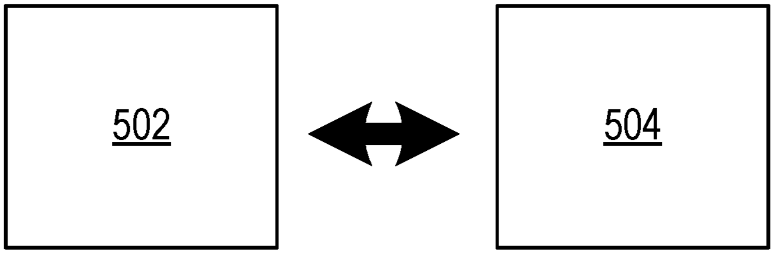
FIG. 5 is a schematic illustration of an example of a computer-readable medium in communication with a processor.

Another aspect of the present invention relates to a computer program product. FIG. 5 is a schematic illustration of an example of a processor 502 in communication with a computer-readable medium 504. The processor 502 may comprise or function similarly to the processing unit 108 and/or the processor 408 disclosed herein. According to various embodiments, a computer program product comprises a non-transitory computer-readable medium 504, the computer-readable medium having computer-readable code embodied therein, the computer-readable code being configured such that, on execution by a suitable computer or processor 502, the computer or processor is caused to perform steps of the method 300 disclosed herein.

The processor 108, 408, 502 can comprise one or more processors, processing units, multi-core processors or modules that are configured or programmed to control the apparatus 102, 400 in the manner described herein. In particular implementations, the processor 108, 408, 502 can comprise a plurality of software and/or hardware modules that are each configured to perform, or are for performing, individual or multiple steps of the method described herein.

The term "module", as used herein is intended to include a hardware component, such as a processor or a component of a processor configured to perform a particular function, or a software component, such as a set of instruction data that has a particular function when executed by a processor.

It will be appreciated that the embodiments of the invention also apply to computer programs, particularly computer programs on or in a carrier, adapted to put the invention into practice. The program may be in the form of a source code, an object code, a code intermediate source and an object code such as in a partially compiled form, or in any other form suitable for use in the implementation of the method according to embodiments of the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other. An embodiment relating to a computer program product comprises computer-executable instructions corresponding to each processing stage of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Variations to the disclosed embodiments can be understood and effected by those skilled in the art in practicing the principles and techniques described herein, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A system comprising:

a hair cutting device having a cutting element for cutting a subject's hair;

a localisation unit for acquiring location data indicative of a location of the cutting element relative to a body part of the subject;

a timer unit for measuring time data associated with usage of the hair cutting device; and a processing unit in communication with the hair cutting device, the localisation unit and the timer unit, the processing unit being configured to:

determine, based on the acquired location data, a region of the subject's body part corresponding to the location of the cutting element;

determine, based on the time data and the determined body part region, an amount of time spent by the cutting element within the determined body part region;

determine, based on the determined amount of time, an operating parameter to be applied to the hair cutting device when the cutting element is within the determined body part region; and operate the hair cutting device according to the determined operating parameter.

2. A system according to claim 1, further comprising:

a storage unit for storing the location data, the time data and the determined operating parameter.

3. A system according to claim 1, wherein the processing unit is configured to:

determine, based on the time data and the determined body part region, an amount of time spent by the cutting element within the determined body part region;

calculate, based on the determined amount of time and a reference duration corresponding to the determined body part region, a performance score indicative of the hair cutting performance within the determined body part region; and determine, based on the performance score, an operating parameter to be applied to the hair cutting device when the cutting element is within the determined body part region.

4. A system according to claim 1, wherein the hair cutting device comprises an accelerometer configured to measure acceleration data indicative of an acceleration of the hair cutting device during use; and wherein the processing unit is configured to:

determine, based on the acceleration data and the acquired location data, a number of passes made with the hair cutting device over skin of the subject within the determined body part region; and determine, based on the number of passes made over the skin, an operating parameter to be applied to the hair cutting device when the cutting element is within the determined body part region.

5. A system according to claim 1, wherein the hair cutting device comprises an accelerometer configured to measure acceleration data indicative of an acceleration of the hair cutting device during use; and wherein the processing unit is configured to:

determine, based on the acceleration data, an average speed of motion of the hair cutting device over skin of the subject within the determined body part region; and determine, based on the average speed of motion, an operating parameter to be applied to the hair cutting device when the cutting element is within the determined body part region.

6. A system according to claim 2, wherein the storage unit is configured to store location data and time data for the hair cutting device acquired over a plurality of hair cutting activities performed by the subject; and wherein the processing unit is configured to determine, based on the stored data over the plurality of hair cutting activities, an optimum operating parameter.

7. A system according to claim 1, wherein the operating parameter to be applied to the hair cutting device comprises an operating parameter selected from a group comprising: a position of a blade of the cutting element relative to skin of the subject; a spindle force applied to a spindle of the cutting element; and a rotational speed of a blade of the cutting element.

8. A computer-implemented method of determining operating parameters of a hair cutting device, the method comprising:

obtaining location data indicative of a location of a cutting element of the hair cutting device relative to a body part of a subject whose hair is being cut using the hair cutting device;

obtaining time data associated with usage of the hair cutting device; and determining, based on the acquired location data, a region of the subject's body part corresponding to the location of the cutting element; and, based on the time data and the determined body part region, an amount of time spent by the cutting element within the determined body part region; an operating parameter to be applied to the hair cutting device when the cutting element is within the determined body part region.

9. A computer-implemented method according to claim 8, further comprising:

applying the determined operating parameter to the hair cutting device.

10. A computer-implemented method according to claim 8, wherein said determining an operating parameter comprises determining an operating parameter to be applied to the hair cutting device so as to cause the subject's hair to be cut more quickly.

11. A computer program product comprising a non-transitory computer-readable medium, the computer-readable medium having computer-readable code embodied therein, the computer-readable code being configured such that, on execution by a suitable computer or processor, the computer or processor is caused to perform the method of claim 8.

12. A hair cutting device comprising:

a cutting element for cutting a subject's hair;

a localisation module for acquiring location data indicative of a location of the hair cutting element relative to a body part of the subject;

a timer module for measuring time data associated with usage of the hair cutting device; and a processor configured to determine:

based on the location data a region of the subject's body part corresponding to the location of the cutting element; and based on the time data and the determined body part region, an amount of time spent by the cutting element within the determined body part region, an operating parameter to be applied to the hair cutting device when the cutting element is within the determined body part region; and operate the hair cutting device according to the determined operating parameter.

* * * * *